US005886984A

United States Patent [19]
Abu-Amara et al.

[11] Patent Number: 5,886,984
[45] Date of Patent: Mar. 23, 1999

[54] METHOD AND SYSTEM FOR SERVICE CAPACITY CALCULATION FOR MULTIMEDIA SERVICES UNDER AGGREGATE TRAFFIC CONDITIONS

[75] Inventors: Hosame Hassan Abu-Amara, Richardson; Venkat Kotamarti, Dallas, both of Tex.

[73] Assignee: Northern Telecom Limited, Quebec, Canada

[21] Appl. No.: 775,161

[22] Filed: Dec. 31, 1996

[51] Int. Cl.[6] .................................................. H04J 3/16
[52] U.S. Cl. ........................... 370/252; 370/468; 455/454
[58] Field of Search .................................... 370/229, 230, 370/252, 465, 468, 235, 433, 437; 455/453, 454, 528, 426, 67.1

[56] References Cited

U.S. PATENT DOCUMENTS

| | | | |
|---|---|---|---|
| 4,893,305 | 1/1990 | Fernandez et al. | 370/468 |
| 5,428,819 | 6/1995 | Wang et al. | 455/454 |
| 5,724,659 | 3/1998 | Daniel et al. | 455/454 |
| 5,751,712 | 5/1998 | Farwell et al. | 370/465 |

*Primary Examiner*—Chi H. Pham
*Assistant Examiner*—Maikhanh Tran
*Attorney, Agent, or Firm*—John D. Crane; Andrew J. Dillon

[57] ABSTRACT

A method and system are provided for calculating the total service capacity for multimedia traffic under aggregate traffic conditions within a shared transmission medium, such as an ATM network. A total number of different types of telecommunication traffic is specified by the network operator or network designer. Each different type of network telecommunication traffic is referred to as a service. Next, each week is partitioned into several busy periods. This partitioning is provided by the network operator and may include multiple days, for example: Monday–Friday; and, Saturday–Sunday. Thereafter, for each busy day described above, the day is further partitioned into several busy periods, each period discernible from a previous period by the level of activity expected within the network at that time. For example, 8:00 a.m.–5:00 p.m.; and, 5:00 p.m.–7:00 a.m. Once again, this information is provided by the network operator or network designer. Thereafter, for each busy period identified and for each service a specification of the length of that period, a probability that a user will access the service during that busy period, a percentage of all subscribers who subscribe to and use that particular service and the average session duration are specified. These values may be obtained from measurements, research literature or from standards bodies. The simultaneous capacity for each busy period for each service is then calculated. These inputs may then be utilized to calculate the total service capacity for the network. That is, the maximum number of users which can subscribe to each service within the network.

10 Claims, 3 Drawing Sheets

METHOD AND SYSTEM FOR SERVICE CAPACITY CALCULATION FOR MULTIMEDIA SERVICES UNDER AGGREGATE TRAFFIC CONDITIONS

CROSS-REFERENCE TO RELATED APPLICATION

This application is related to co-pending U.S. patent application Ser. No. 08/775,158, (Attorney Docket No. 0267AD-RR1154) and U.S. patent application Ser. No. 08/775,162, (Attorney Docket No. 0267AD-RR1158), both filed of even date herewith by the inventors herein named. The aforementioned co-pending applications are hereby incorporated herein by reference thereto.

BACKGROUND OF THE INVENTION

1. Technical Field

The present invention relates to improvements in network design and in particular to improved methods and systems for capacity calculation in a shared transmission medium network. Still more particularly, the present invention relates to a method and system for service capacity calculation for multimedia services under aggregate traffic conditions in a network having identifiable busy periods.

2. Description of the Related Art

No where has the explosion of modern technology been more evident than in the field of communication. The number and type of communication services has been rapidly expanding, including so-called "multimedia" services such as video teleconferencing, video/movies on demand and the like.

The intermixing of these multimedia services with traditional data and voice communications within a shared transmission medium has presented various design problems. For example, consider a system which receives packetized telecommunication traffic from n multimedia services which are queued either in one central queue or in multiple distributed queues wherein one queue is associated with each service. Thus, if more than n subscribers to the services are utilizing the network at any given time, the received packets which are not processed by the system are queued. During heavy use periods, as the number of users increase, and these queues become quite large, certain packets may be discarded based upon a priority scheme and delay will increase and quality of service will suffer.

Consequently, those skilled in the art will appreciate that one design requirement for a viable multimedia network requires that a limit exits for the number of users simultaneously connected to the network so that customer expectations and network efficiency will not suffer.

One common technique utilized in the past to satisfy customer expectations is to ensure that the quality of service parameter values for the multimedia services are not exceeded. In view of the fact that a modern network may include multiple diverse multimedia services having variable quality of service values, this has been very difficult to accomplish.

In the past, attempts at statistically modeling aggregate traffic which originates from homogenous services with similar traffic types and similar characteristics have been proposed. For example, the Poisson Process is widely utilized to model aggregate traffic from voice sources. Similarly, the discreet Auto Regressive Process has been utilized to model aggregate traffic from video-teleconferencing sources. A Markov Modulated Poisson Process is often utilized to model aggregate traffic from data sources. These techniques typically require complex mathematical expressions which are not explicit and which require time-consuming numerical methods to solve.

Service capacity is defined as the maximum number of users that the system can support so that the values of the quality of service parameters are not violated. Thus, while the simultaneous capacity of a multimedia network, i.e. the maximum number of users or subscribers which can simultaneously access individual services within that network so that the values of the quality of service parameters are not violated, can be determined by various techniques, these techniques result in an underestimate of the total service capacity of the network since maximum simultaneous capacity will not be attained constantly. One difficulty utilizing the prior art techniques for extending simultaneous capacity to service capacity is the problem that there may be several busy periods within each day and that there can be several busy days within each week. Thus, techniques for calculating simultaneous capacity for multimedia service within a network have not been generally successful in the calculation of service capacity for a network.

Thus, those skilled in the art will appreciate that a method and system for accurately and efficiently calculating total service capacity of multimedia services under aggregate traffic conditions would greatly enhance the efficiency of network design and the level of customer satisfaction.

SUMMARY OF THE INVENTION

It is therefore one object of the present invention to provide an improved network design.

It is another object of the present invention to provide improved methods and systems for capacity calculation in a shared transmission medium network.

It is yet another object of the present invention to provide an improved method and system for service capacity calculation for multimedia services under aggregate traffic conditions in a network having identifiable busy periods.

The foregoing objects are achieved as is now described. A method and system are provided for calculating the total service capacity for multimedia traffic under aggregate traffic conditions within a shared transmission medium, such as an ATM network. A total number of different types of telecommunication traffic is specified by the network operator or network designer. Each different type of network telecommunication traffic is referred to as a service. Next, each week is partitioned into several busy periods. This partitioning is provided by the network operator and may include multiple days, for example: Monday–Friday; and, Saturday–Sunday. Thereafter, for each busy day described above, the day is further partitioned into several busy periods, each period discernible from a previous period by the level of activity expected within the network at that time. For example, 8:00 a.m.–5:00 p.m.; and, 5:00 p.m.–7:00 a.m. Once again, this information is provided by the network operator or network designer. Thereafter, for each busy period identified and for each service a specification of the length of that period, a probability that a user will access the service during that busy period, a percentage of all subscribers who subscribe to and use that particular service and the average session duration are specified. These values may be obtained from measurements, research literature or from standards bodies. The simultaneous capacity for each busy period for each service is then calculated. These inputs may then be utilized to calculate the total service capacity for the network. That is, the maximum number of users which can subscribe to each service within the network.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
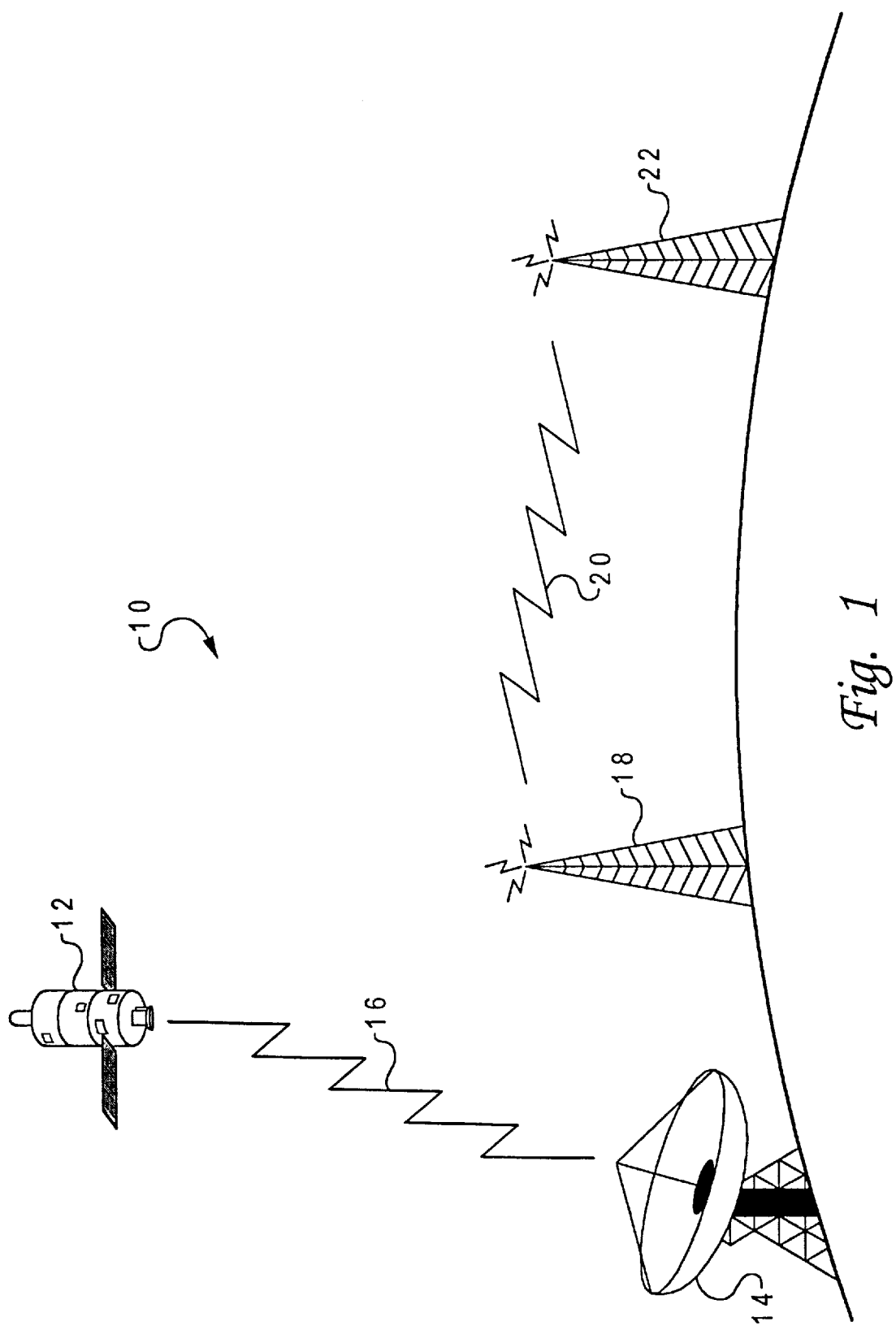
FIG. 1 is a schematic representation of a communication network which can incorporate multimedia traffic within an shared transmission medium.

With reference now to the figures and in particular with reference to FIG. 1, there is depicted a schematic representation of a communication network which incorporates multimedia traffic within a shared transmission medium. As illustrated, communication network 10 may include multiple transmission sources and receivers coupled together utilizing various transmission medium. For example, one type of network which may advantageously utilize the method and system of the present invention, is an ATM network which is utilized in conjunction with satellite communication. Thus, satellite 12 may communicate with earth station 14 over transmission medium 16. Similarly transmission tower 18 may communicate with transmission tower 22 over transmission medium 20. Of course, those skilled in the art will appreciate that transmission medium 16 will comprise a high frequency wide bandwidth radio frequency transmission medium; however, the method and system of the present invention will find application in any system in which aggregate multimedia traffic will occupy a shared transmission medium, such as, for example, a fiber optic transmission medium.

Figure 2:
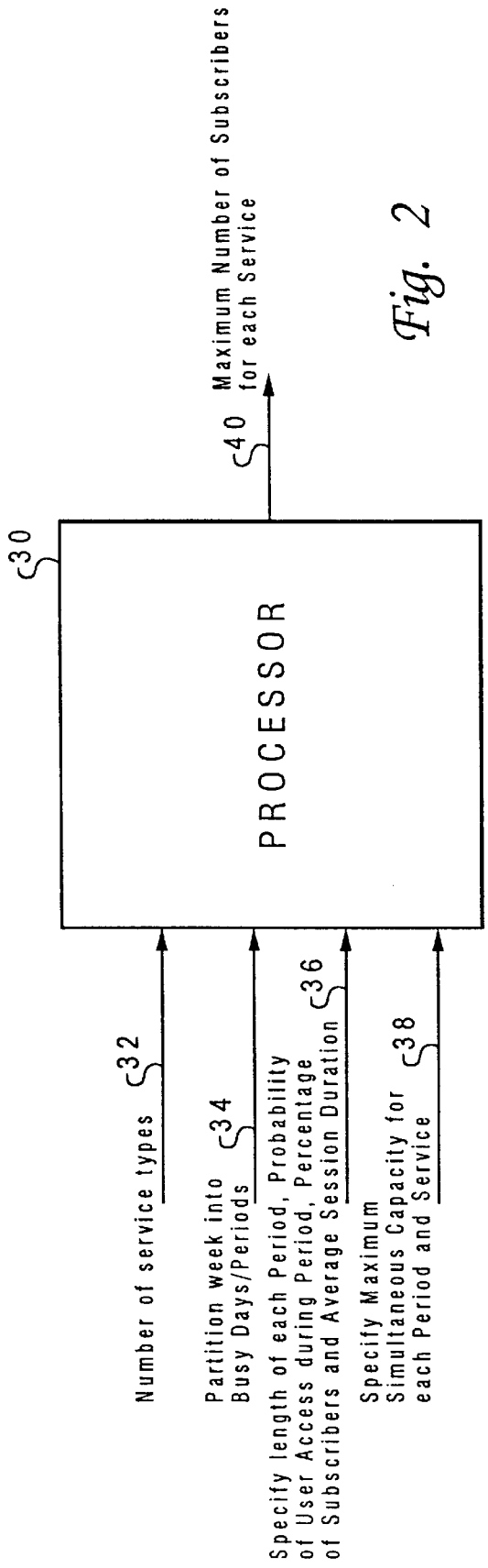
FIG. 2 is a high level block diagram of a system for calculating maximum service capacity for multimedia traffic under aggregate traffic conditions within a shared transmission medium.

Referring now to FIG. 2 there is depicted a high level block diagram of a system for calculating maximum service capacity for multimedia traffic under aggregate traffic conditions within a shared transmission medium in accordance with the present invention. As illustrated, the system depicted in FIG. 2 utilizing, as its central element, processor 30. Processor 30 may comprise an appropriately programmed computer such as a personal computer, workstation or other suitable computer possessing sufficient processor assets and processing capability to create the model which will described herein.

Those skilled in the art will appreciate that in order to accurately calculate the maximum service capacity for multimedia traffic under aggregate traffic conditions within a shared transmission medium, it is necessary to accurately describe the various types of aggregate traffic which originate from the heterogeneous sources which may include widely diverse quality of service characteristics. Thus, it is important to generate appropriate parameters for this assessment so that these parameters may be utilized as an input to a network design tool.

As depicted, processor 30 utilizes four different inputs to generate the maximum number of subscribers which may be enlisted for each service. Input 32, as depicted within FIG. 2, comprises the total number of different types of telecommunication traffic within the transmission medium. This number is typically provided by the network operator or the design engineer specifying a particular network. Each type of telecommunication traffic is referred to herein as a "service." These services may include voice, data, teleconferencing, video on demand and other similar communication types.

Next, as specified at input 34, each week is partitioned into several periods of differing levels of activity. These so-called "busy periods" are typically identified by the design engineer or network operator and each period may include several days. For example, one simple partition of the week into several busy periods may include a first period "Monday–Friday" and a second period "Saturday–Sunday." Thereafter, each busy period identified above is further partitioned into time periods of varying utilization. Thus, for example, the utilization levels are expected to be higher during the period 8:00 a.m.–5:00 p.m. and this time period may then further comprise a separate busy period. The utilization from 5:00 p.m. until 7:00 a.m. would be expected to be lower and this period can also be separately addressed.

Next, as specified at input 36, the length of each period identified above, the probability of user access during each period, the percentage of all subscribers who subscribe to and use each service and the average session duration within that service are specified. These values can be obtained from measurements of existing networks, research literature or from standards bodies such as the International Telecommunication Union-Telecommunication (ITU-T).

Finally, as specified at input 36, the simultaneous maximum capacity for each busy period and each service is determined. This simultaneous maximum capacity may be simply calculated by determining the maximum number of subscribers who can subscribe to a particular service without the occurrence of degradation of the equality of service parameters for that service within the specified parameters of the network. One excellent technique for calculating the simultaneous capacity for each busy period and for each service is set forth in one of the above-referenced co-pending patent applications.

These inputs, when combined in the manner which will be described in detail below, can be utilized to produce output 40 which is an accurate assessment of the maximum number of subscribers for each service which can be enrolled within the network for the design parameters which have been specified.

Thus, output 40 specifies the maximum number of subscribers for each service within a network, greatly enhancing the efficiency and utilization of a proposed network.

Figure 3:
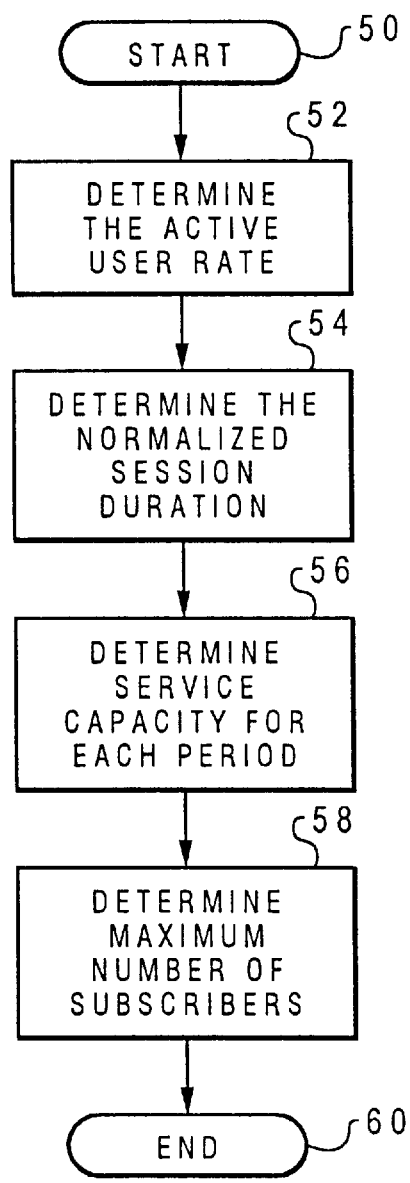
FIG. 3 is a high level logic flowchart of the method for calculating service capacity for multimedia traffic under aggregate traffic conditions within a shared transmission medium in accordance with the present invention.

Finally, with reference to FIG. 3, there is depicted a high level logic flowchart of the method of total service capacity calculation for multimedia services under aggregate traffic conditions in accordance with the present invention. As illustrated, the process begins at block 50 and thereafter passes to block 52. Block 52 illustrates the determination of the active user rate. This may be determined as follows: For each busy period P, and for each service i, the preliminary active user rate $\gamma(P,i)$ is determined for service i during period P, i.e. the average percentage of all subscribers which will use service i during period P. Thus, if there are K services within the network, for each period P and service i, the active user rate $\lceil(P_i)$ is defined as:

$$\min\left[\gamma(P,i)\frac{\gamma(P,i)}{\sum_{j=1}^{K}\gamma(P,i)}\right]$$

Next, the process passes to block 54. Block 54 illustrates the determination of the normalized session duration. Thus, the normalized session duration may be determined by specifying, for each period P and service i, the probability E, that a user will use service i, the percentage $M_i$ of subscribers to service who actually use service i and the session duration $S_i$ for service i. The calculation of the normalized session duration can be accomplished by assuming that the length of the busy period is T and thereafter defining the normalized session duration $G_i$ as: $G_i$=max $\{1,T/S_i\}$ These values are inputs and may be obtained from measurements of an existing network, research literature or from standards bodies such as the ITU-T.

Although shown as occurring in linear fashion within the high-level logic flowchart of FIG. 3, those having ordinary skill in the art will appreciate that the steps depicted within blocks 52 and 54 may take place concurrently.

Next, as depicted at block 56, the service capacity for each period is determined. This may be accomplished by letting N(P,i) be the simultaneous capacity for each period P and service i. Thereafter, define D as the collection of all busy periods. Thereafter, for each busy period P, the period service capacity N(P) may be calculated as follows:

$$N(P) = \sum_{i=1 P \in D}^{K} \frac{\Gamma(P,i) * N(P,i) * G_i}{E_i * M_j}$$

Finally, as depicted in block 58, the maximum number of subscribers or service capacity N may be determined as being equal to min N(P) over all busy periods P. Thereafter, the process passes to block 60 and terminates.

Upon reference to the foregoing, those skilled in the art will appreciate that by utilizing the modeling techniques set forth herein, the maximum service capacity for multimedia traffic under aggregate traffic conditions within a shared transmission medium may be accurately and efficiently assessed despite the presence of diverse traffic types and quality of service characteristics. The method and system of the present invention utilizes the number of different services, a partitioning of the week into busy periods, the probability of user access during those periods and the calculated simultaneous capacity for each period to accurately and efficiently calculate the maximum service capacity for multimedia services under aggregate traffic conditions for networks which utilize a shared transmission medium. The method and system set forth herein provide a model which is simple enough to be evaluated very rapidly and in real-time and which is accurate enough to be comparable with time-consuming numerical methods set forth in the prior art.

While the invention has been particularly shown and described with reference to a preferred embodiment, it will be understood by those skilled in the art that various changes in form and detail may be made therein without departing from the spirit and scope of the invention.

What is claimed:

1. A method for determining total service capacity for a plurality of heterogenous telecommunication services under aggregate traffic conditions within a network having a shared transmission medium, said method comprising the steps of:

specifying a total number of heterogenous telecommunication services within said network;

partitioning each week into a plurality of busy periods;

determining a maximum simultaneous capacity for each of said plurality of heterogenous telecommunication services during each of said plurality of busy periods, based upon a required quality of service for each of said plurality of heterogenous telecommunication services;

determining a probability of user access of each of said plurality of heterogenous telecommunication services during each of said plurality of busy periods; and determining a total service capacity for each of said plurality of heterogenous telecommunication services within said network based upon said determined maximum simultaneous capacity and said determined probability of user access of each of said plurality of heterogenous telecommunication services during each of said plurality of busy periods.

2. The method for determining total service capacity for a plurality of heterogenous telecommunication services according to claim 1 further including the step of determining what percentage of all users subscribe to each of said plurality of heterogenous telecommunication services.

3. The method for determining total service capacity for a plurality of heterogenous telecommunication services according to claim 2 further including the step of determining an average session duration for each access to one of said plurality of heterogenous telecommunication services.

4. The method for determining total service capacity for a plurality of heterogenous telecommunication services according to claim 1 wherein said step of partitioning each week into a plurality of busy periods further comprises the step of partitioning each week into a first plurality of busy days.

5. The method for determining total service capacity for a plurality of heterogenous telecommunication services according to claim 4 wherein said step of partitioning each week into a first plurality of busy days further comprises the step of partitioning said plurality of busy days into a second plurality of busy time periods within each busy day.

6. A system for determining total service capacity for a plurality of heterogenous telecommunication services under aggregate traffic conditions within a network having a shared transmission medium, said system comprising:

means for specifying a total number of heterogenous telecommunication services within said network;

means for partitioning each week into a plurality of busy periods;

means for determining a maximum simultaneous capacity for each of said plurality of heterogenous telecommunication services during each of said plurality of busy periods, based upon a required quality of service for each of said plurality of heterogenous telecommunication services;

means for determining a probability of user access of each of said plurality of heterogenous telecommunication services during each of said plurality of busy periods; and means for determining a total service capacity for each of said plurality of heterogenous telecommunication services within said network based upon said determined maximum simultaneous capacity and said determined probability of user access of each of said plurality of heterogenous telecommunication services during each of said plurality of busy periods.

7. The system for determining total service capacity for a plurality of heterogenous telecommunication services according to claim 6 further including means for determining what percentage of all users subscribe to each of said plurality of heterogenous telecommunication services.

8. The system for determining total service capacity for a plurality of heterogenous telecommunication services according to claim 7 further including means for determining an average session duration for each access to one of said plurality of heterogenous telecommunication services.

9. The system for determining total service capacity for a plurality of heterogenous telecommunication services according to claim 6 wherein said means for partitioning each week into a plurality of busy periods further comprises means for partitioning each week into a first plurality of busy days.

10. The system for determining total service capacity for a plurality of heterogenous telecommunication services according to claim 9 wherein said means for partitioning each week into a first plurality of busy days further comprises means of partitioning said plurality of busy days into a second plurality of busy time periods within each busy day.

* * * * *